United States Patent Office 3,499,049
Patented Mar. 3, 1970

3,499,049
ACCELERATED PRODUCTION OF CIS,TRANS,
TRANS-CYCLODODECATRIENE-(1,5,9)
Udo Hochmuth, Wolfhard Ring, and Hanns Strache, Marl,
Germany, assignors to Chemische Werke Huels A.G.,
Marl, Germany
No Drawing. Filed Apr. 30, 1968, Ser. No. 725,527
Claims priority, application Germany, June 3, 1967,
C 42,534
Int. Cl. C07c 13/02
U.S. Cl. 260—666        2 Claims

ABSTRACT OF THE DISCLOSURE

In a process for the production of cis, trans, trans-cyclododecatriene-(1,5,9) by reacting butadiene at 20–80° C. in the presence of titanium tetrachloride in concentrations of 0.25–5.7 millimols and alkyl-aluminum sesquichloride in concentrations of 67–143 millimols per kilogram of inert diluent, the improvement comprising utilizing an un-aged catalyst and employing water in the inert diluent in concentrations of 50–200 p.p.m., based on the inert diluent, thereby substantially increasing the rate of reaction.

Background of the invention

This invention relates to an improved process for the production of cis, trans, trans-cyclododecatriene-(1,5,9). It is known from German Published Application (DAS) 1,112,069 that cis, trans, trans-cyclododecatriene-(1,5,9), in addition to other cyclic hydrocarbons, can be produced by reacting butadiene-(1,3) in the presence of titanium tetrachloride in concentrations of 0.25–5.7 millimols and alkylaluminum sesquichloride in concentrations of 67–143 millimols per kg. of diluent at temperatures up to 150° C. Suitable in this connection as inert diluents are aliphatic, cycloaliphatic and particularly aromatic hydrocarbons such as benzene and the homologs thereof. Under these conditions, the synthesis of cyclododecatriene-(1,5,9) can be conducted in a batch or continuous manner. The reaction rate of this process is subject to improvement.

Summary of the invention

An object of this invention is to increase the reaction rate of the process described in German Patent 1,112,069 for the production of cis, trans, trans-cyclododecatriene-(1,5,9) (hereinafter alternatively referred to as CDT).

Upon further study of the specification and claims, other objects and advantages of the present invention will become apparent.

To attain the objects of the invention, it has been unexpectedly discovered that the rate of reaction can be considerably increased by maintaining, in the reaction mixture, 50–200, preferably 70 to 120 p.p.m. (parts per million by weight) of water based on the weight of the inert solvent. As was observed, in the above-mentioned reaction, the presence of the above-disclosed specific amounts of water causes an increase in the reaction speed of the cyclizing trimerization of butadiene to form CDT, while simultaneously maintaining the high yields of CDT which are obtained under more anhydrous conditions. Furthermore, the formation of polybutadiene, which normally occurs as a side reaction, is hardly increased, which is quite surprising. This discovery leads to a considerable improvement of the space-time yield for the synthesis of cyclododecatriene-(1,5,9). It is also important that the catalyst be used directly without aging.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example I

In 400 parts by weight of benzene, the water content was adjusted in the quantities set forth in the Table 1 below. This is accomplished by mixing absolutely anhydrous benzene with water-containing benzene, and was analytically ensured by titration in accordance with Karl Fisher. In this water-adjusted benzene there were dissolved 24 g. butadiene-(1,3), previously dried by condensing over triethylaluminum. Then, to the mixture were directly added $38.7 \cdot 10^{-3}$ parts by weight (0.2 millimol) of titanium tetrachloride and 1.54 parts by weight (12 millimols) of ethylaluminum sesquichloride, corresponding to an Al:Ti ratio of 60:1 (without aging) in a solution of 22 parts by weight of the same water-adjusted benzene. The reaction was conducted at 40° C., and the following Table 1 represents the results of a number of comparative reaction rate experiments conducted under the same reaction conditions, but with varying water content:

TABLE 1

| Experiment | $H_2O$ content, p.p.m. | $k[sec.^{-1}]$ [1] | CDT-Yield based on the Butadiene Employed |
|---|---|---|---|
| 1 | 100 | $23.7 \cdot 10^{-4}$ | 94.2 |
| 2 | 100 | $21.6 \cdot 10^{-4}$ | 93.4 |
| 3 | Below 10 | $11.8 \cdot 10^{-4}$ | 94.2 |
| 4 | Below 10 | $11.2 \cdot 10^{-4}$ | 92.8 |

[1] Evaluation according to the relationship $$+\frac{d[CDT]}{dt} = \tfrac{1}{3} k \cdot [\text{butadiene}]$$

In this connection, experiments 3 and 4 weer conducted in accordance with German published application (DAS) 1,112,069 with dry benzene (below 10 p.p.m.). It is seen that in experiments 1 and 2, the rate of reaction for the formation of CDT is considerably faster than in experiments 3 and 4 and that the average yield of experiments 1 and 2 is slightly higher than that of 3 and 4. Accordingly, the economically important space-time yield in experiments 1 and 2 is substantially improved over experiments 3 and 4.

Example 2

The reaction was continuously conducted at 60° C. in a 6-liter agitated reactor. The hourly rates of introducing benzene, ethylaluminum sesquichloride, titanium tetrachloride and butadiene are set forth in Table 2 below. These amounts were controlled in response to the quantity of waste gas produced, this quantity increasing at decreased reaction speed and simultaneously being enriched in butadiene-(1,3). In the two experiments outlined in Table 2, the water content was adjusted by mixing bone dry and aqueous benzene solutions, in experiment (1) to 115–140 p.p.m. and in experiment (2) to 40 p.p.m. based on the amount of benzene.

TABLE 2

| | Experiment 1 | Experiment 2 |
|---|---|---|
| $H_2O$ content, p.p.m | 115–140 | 40 |
| Charged benzene, kg | 0.9 | 0.7 |
| Charged butadiene, [1] kg | 0.9 | 0.7 |
| Charged ethylaluminum sesquichloride, kg | 0.0055 | 0.0055 |
| Charged titanium tetrachloride, kg | 0.00015 | 0.00015 |
| Waste gas | 2.1 | 10.1 |
| Reaction products: | | |
| Cyclododecatriene | 0.830 | 0.620 |
| Polybutadiene | 0.045 | 0.050 |
| Intermediate runnings | 0.015 | 0.010 |

[1] The butadiene contained 99.5% of butadiene −(1,3).

Although Dutch patent applications 65/14,358 and 65/1,739 disclose production of cyclododecatriene from butadiene, in the presence of catalyst systems of $TiCl_4$ and dialkylaluminum monochloride or aluminum trichloride and trialkylaluminum or dialkylaluminum hydride, with definite amounts of water, much higher concentrations of titanium tetrachloride (2 to $3 \cdot 10^{-3}$) mol/l. are employed. In comparison, the present process employs approximately one-tenth to one-twentieth of the amount of titanium catalyst component, and quite unexpectedly results in identical yields of cyclododecatriene.

This effect is surprising since, under the conditions described in this invention, a water content of 100 p.p.m. constitutes a tenfold excess (or more) with respect to $TiCl_4$. In view of the well-known sensitivity of $TiCl_4$ at higher concentrations towards water, a high catalytic activity of the system under these conditions could not be expected.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. In a process for the production of cis, trans, trans-cyclododecatriene-(1,5,9) by reacting butadiene at 20–80° C. in the presence of a catalyst comprising titanium tetrachloride in concentrations of 0.25–5.7 millimols and alkylaluminum sesquichloride in concentrations of 67–153 millimols per kilogram of inert organic diluent the improvement comprising using said catalyst directly without aging and employing water in the inert diluent in concentrations of 50–200 p.p.m., based on the inert diluent, thereby substantially increasing the rate of reaction.

2. A process as defined by claim 1 wherein said inert organic diluent is benzene.

References Cited
UNITED STATES PATENTS

| | | |
|---|---|---|
| 3,376,355 | 4/1968 | Van der Berg. |
| 3,076,045 | 1/1963 | Schneider. |

FOREIGN PATENTS

| | | |
|---|---|---|
| 928,812 | 6/1963 | Great Britain. |
| 1,112,069 | 8/1961 | Germany. |

DELBERT E. GANTZ, Primary Examiner

VERONICA O'KEEFE, Assistant Examiner

UNITED STATES PATENT OFFICE
CERTIFICATE OF CORRECTION

Patent No. 3,499,049          Dated March 3, 1970

Inventor(s) Udo Hochmuth, Wolfhard Ring, Hanns Strache

It is certified that error appears in the above-identified patent and that said Letters Patent are hereby corrected as shown below:

Column 2, Line 36, change "weer" to ---were---

Column 4, Line 6, change "153" to ---143---

SIGNED AND
SEALED

SEP 29 1970

(SEAL)
Attest:

Edward M. Fletcher, Jr.
Attesting Officer

WILLIAM E. SCHUYLER, JR.
Commissioner of Patents